(12) United States Patent
Kölker et al.

(10) Patent No.: US 6,547,906 B1
(45) Date of Patent: Apr. 15, 2003

(54) PROCESS FOR TRANSPORTING A BELT CONSTRUCTION STRIP FOR CONSTRUCTING A BELT FOR A PNEUMATIC VEHICLE TIRE

(75) Inventors: Martin Kölker, Hannover (DE); Horst Sergel, Hannover (DE)

(73) Assignee: Continental Aktiengesellschaft, Hannover (DE)

( * ) Notice: Subject to any disclaimer, the term of this patent is extended or adjusted under 35 U.S.C. 154(b) by 570 days.

(21) Appl. No.: 08/947,149

(22) Filed: Oct. 8, 1997

(30) Foreign Application Priority Data

Oct. 9, 1996 (DE) .......................................... 196 41 509

(51) Int. Cl.⁷ ............................................. B29D 30/30
(52) U.S. Cl. ...................... 156/123; 156/133; 156/134; 156/406.4
(58) Field of Search ................................. 156/123, 130, 156/133, 134, 405.1, 406.4, 394.1, 64, 110.1

(56) References Cited

U.S. PATENT DOCUMENTS

| | | | |
|---|---|---|---|
| 4,359,675 A | * 11/1982 | Miller, III | 318/603 |
| 4,769,104 A | 9/1988 | Okuyama et al. | |
| 5,092,946 A | * 3/1992 | Okuyama et al. | 156/134 |
| 5,111,722 A | * 5/1992 | Tada et al. | 83/23 |
| 5,167,751 A | * 12/1992 | Shimizu et al. | 156/502 |
| 5,194,107 A | * 3/1993 | Okuyama et al. | 156/123 |
| 5,206,720 A | * 4/1993 | Clothiaux et al. | 156/394.1 |
| 5,582,664 A | * 12/1996 | Sergel et al. | 156/130 |
| 5,720,837 A | * 2/1998 | Regterschott et al. | 156/133 |

FOREIGN PATENT DOCUMENTS

| | | |
|---|---|---|
| DE | 3913240 | 8/1991 |
| EP | 0649730 | 4/1995 |

* cited by examiner

*Primary Examiner*—Geoffrey L. Knable
(74) *Attorney, Agent, or Firm*—Greenblum & Bernstein, P.L.C.

(57) ABSTRACT

Process and device for transporting a belt construction strip having parallel reinforcing members embedded in a belt construction material for forming a belt for a pneumatic vehicle tire. The process may include feeding the belt construction strip in a feed direction toward a subsequent processing device, such that the feed direction is oblique to the reinforcing members and the belt construction strip includes two lateral sides extending in the feed direction, forming a front edge on a front end of the belt construction strip in the feed direction and a rear edge on a rear end of the belt construction strip in the feed direction, such that the front and rear edges extend obliquely to the feed direction and substantially parallel to the reinforcing members, defining a front tip from a portion of the belt construction strip enclosed by the front edge and one of the two lateral sides, defining a rear tip from a portion of the belt construction strip enclosed by rear edge and the other of the two lateral sides, and feeding the belt construction strip along at least two conveying devices. The process may also include laterally aligning the front tip in accordance with its form and position, laterally aligning the belt construction strip, in a region between the front tip and the rear tip, in accordance with its position, and laterally aligning the rear tip in accordance with its form and position.

16 Claims, 4 Drawing Sheets

PROCESS FOR TRANSPORTING A BELT CONSTRUCTION STRIP FOR CONSTRUCTING A BELT FOR A PNEUMATIC VEHICLE TIRE

CROSS-REFERENCE TO RELATED APPLICATION

The present application claims priority under 35 U.S.C. § 119 of patent application No. 196 41 509.8, filed Oct. 9, 1996, the disclosure of which is expressly incorporated by reference herein in its entirety.

BACKGROUND OF THE INVENTION

1. Field of the Invention

The present invention relates to a process for transporting a belt construction strip, utilized for constructing a belt for a pneumatic vehicle tire having parallel reinforcing members, e.g., steel members, embedded in a belt construction material, e.g., rubber, and positioned diagonally to the feed direction, to a subsequent processing device, e.g., a belt construction drum. The belt construction strip is further processed for processing in the subsequent processing device. The belt construction strip, which may be defined by a side edge of its two lateral sides in a feed direction and by a front edge on a front end relative to the feed direction and a rear edge on a rear end relative to the feed direction The front and rear edges may extend diagonally and substantially parallel to the reinforcing members so that a front tip, formed by the front edge and an adjacent side edge, and a rear tip, formed by the rear edge and the other side edge, enclose an acute angle, e.g., between approximately 10° and 35°. The front tip and the rear tip may be fed to the processing device via at least two conveying devices, e.g., continuous conveying belts, successively positioned, i.e., one after the other, in the feed direction, and laterally aligned without a lateral stop.

The present invention also relates to a device for conveying and preparing a belt construction strip for constructing a belt of a pneumatic vehicle tire with parallel reinforcing members, e.g., steel members, positioned to extend diagonally to the feed direction, and embedded in the belt construction material, e.g., rubber, for processing in a subsequent processing device, e.g., a belt construction drum. Two continuous conveying devices may be successively positioned, i.e., one after the other, in a feed direction, and at least the conveying device disposed upstream relative to the feed direction may be laterally movable in a controlled manner.

2. Discussion of the Background Information

It is known to form belt construction strips for constructing a belt of a pneumatic vehicle tire out of parallel steel cords embedded in rubber, positioned to extend diagonally to a feed direction, and to transport them to a belt construction drum via continuous conveyor belts. The front end of the belt construction strip supplied to the belt construction drum may be placed on the drum, the belt construction drum is rotated around its axis, and the belt construction strip is wound once around the circumference of the belt construction drum so that the rear edge of the wound belt construction strip on the drum comes into contact with the front edge of the belt construction strip. The two ends of the belt construction strip are spliced to each other along their front and rear edges, respectively, without the steel cords overlapping. A second or additional belt layer is usually mounted onto the first belt layer in the same manner. In order for the steel cords, which are given the desired alignment in the pneumatic vehicle tire with an acute angle between 10° and 30° relative to an equatorial plane in radial pneumatic vehicle tires with radial casings, the belt construction strips are formed so that in the laying, the steel cords already assume an acute angle, for example of 10° to 30°, relative to the circumference direction.

In order not to jeopardize the functionality of a pneumatic vehicle tire, the steel cords are prevented, to the greatest extent possible, from being discontinuous in the axial span of the belt. Therefore, when being laid, the front end and the rear end of the belt construction strip must also be formed to be substantially parallel to the alignment of the steel cords and, consequently, must be formed to enclose the acute angle relative to the circumference direction. Therefore, the belt construction strips are formed with lateral and substantially parallel side edges, a diagonally extending front edge, and a diagonally extending rear edge, respectively, so that a substantially triangular front tip, formed between the front edge and one side edge, encloses an acute angle, adjoining an substantially rectangular main part laterally defined by the two side edges. The main part adjoins a substantially triangular rear tip, formed between the rear edge and the other side edge, enclosing an acute angle. This construction strip is normally conveyed to the belt construction drum with its front tip first.

For manufacturing reasons, as well as due to other force influences during the conveying, the side edges of the belt construction strip, which is comprised of rubber and steel cord, are generally not precisely straight in the course of their edges, but are curvilinear. Curvilinearity of the two side edges can be formed as different to each other so that a central symmetry line running in the feed direction, i.e., between the side edges, represents a curvilinear curve running between the two side edges.

Furthermore, generally the two tips are also frequently curved in an irregular fashion due to different external force effects and due to the plastic deformability of the material. The tips can be formed as curved both axially inward and axially outward, or even curved in a directionally changing manner.

The belt construction strips are usually manufactured from a continuous belt construction band by cutting, parallel to the diagonally extending steel cords, to form the rear edge of a previous belt construction strip and a front edge of a next (subsequent) belt construction strip. Through the cutting motion of the knife from the one side edge to the other side edge, rubber material is pulled along to the side with the knife so that the front and rear tips can be curved. This curvature, however, can also be produced by other external force effects during the production of the belt construction strip or during the conveying to the belt construction drum, e.g., due to mechanical contact, side edge stops or front edge stops are a danger source for the production of this kind of curvatures.

When laying a belt construction strip of this kind, irregularities in the contour course of the side edges, as well as the curvatures in the area of the front and rear tips, lead to the fact that the front ends to be spliced can be axially offset relative to each other, and that there is no parallel, touching contour course then between the front edge and rear edge, by which the production of a reliable splicing weld can be hindered and, in the extreme case, prevented.

The irregular, unevenly curved course of the two side edges relative to each other, and the symmetry axis produced by this, which is formed running in a curved fashion between the side edges, brings about the fact that, over the circumference of the tire, the belt construction strip is also given an irregular axial extension and positioning. This jeopardizes the driving properties, the uniformity, and the functionality of a pneumatic vehicle tire produced in this way.

DE 39 13 240 C2 has disclosed using lateral guide rolls, which are positioned on both sides of the metal cord strip and can be jointly adjusted in the axial direction, to straighten a metal cord strip in the course of its side edges. The metal cord strip is cut on a diagonal on the ends and is utilized for the manufacture of a pneumatic vehicle tire. The metal cord strip is conveyed past the lateral stops formed by the lateral guide rolls and is laterally pressed to a desired width. In this manner, the side edges are in fact straightened, but this causes them to be formed to be irregularly thick because only the rubber material in the strip edge region, which reaches axially outward beyond the limit edge formed by the lateral guide rolls, is pressed inward toward the strip. Thus, the rubber material moves out of the way either upward or downward. The previous uneven and mutually irregular contour courses of the two side edges lead to irregular thickness courses of the side edges. Thus, the thickness courses are unevenly irregular relative to each other. Consequently, not only are irregularities of the thickness course formed in both sides of the finished pneumatic vehicle tire, but the two irregular thickness courses are formed as being unevenly irregular so that in a wide variety of circumferential positions on the pneumatic vehicle tire, different maximal thicknesses are produced on the respective sides. Consequently, the uniformity of the tire is impaired. The desired width format that the strip should assume is adjusted by the lateral guide rolls, which can only be adjusted together with each other. As a result, the kind of irregularities in the contour course that protrude beyond the adjusted side position of the guide rolls are actually straightened.

Irregularities in the side edge course, which do not reach the lateral position of the guide rolls, are not altered. As a result of this, irregular curvature courses of both side edges can remain. Thus, the uniformity, the driving properties, and the functionality of the vehicle tire can be further impaired. For the processing of the tips of the metal cord strip, magnets that can be laterally pivoted are guided toward the tips and are intended to pull the steel cords in the metal cord strips against a lateral mechanical stop. Provided that the tips are actually pulled all the way to the stops, then the tips should be aligned there with their side edges against the stops. This also produces the alignment, provided that it succeeds, merely by squeezing together the side edges and accepting an increase in material thickness. This device requires very strong magnets to pull the tips, particularly the tips of belt construction strips with very tough rubber material, toward the stops in a truly reliable manner. In this manner, a tip of the metal cord strip, which is curved axially inward, may actually be pulled by very strong magnets in an axially outward direction to such a degree that the side edge is straightened in the region of the tip. The material pressed away by the stop primarily leads to a thickening of the belt material in the region of the side edge of the metal cord strip. The curved tip is only slightly curved and remains substantially curved in its front and rear edge courses, respectively. With this alignment, there is great danger that the front and rear edge of the metal cord strip still assume a perceptibly curved, non-parallel course after being laid on a belt construction drum. This jeopardizes a reliable splice. Only with very strong magnets and with some less tough types of rubber with very flexible steel cords, is it possible to ensure that the front and rear edges are effectively pulled against the lateral stops and to ensure at least an axial agreement of the position of the front and rear edges on the belt construction drum. When the type of rubber for the belt construction strip is changed, there is always a consequent danger that the alignment force of the magnets will not be ensured. If a changeover to correspondingly strong magnets is forgotten, then the quality of the pneumatic vehicle tire is jeopardized.

On the whole, the device described by DE 39 13 240 C2, which is for aligning a metal cord strip, is very costly in its mechanical construction. A large number of components, lateral guide rolls, mechanisms for adjusting the lateral guide rolls, mechanical stops, levers, and laterally pivotable magnets are required, which necessitate a high expenditure for manufacture and maintenance, for example, of the large number of different joints. The large number of components brings with it a large number of malfunction sources. The effect of the large number of mechanical components, such as a number of lateral guide rolls and lateral stops, furthermore brings with it the danger that due to friction effects between the laterally acting mechanical elements and the metal cord strip, additional, undesirable deformations of the metal cord strip are produced.

U.S. Pat. No. 4,769,104 has disclosed squeezing a belt construction strip on a conveyor belt by two mechanical, lateral aligning rails that are moved toward each other, to straighten the side edges. Here, too, the purely laterally acting mechanical force cause a straightening of the side edge, along with a shifting of material at the expense of irregular thickness changes in the region of the side edge. The lateral alignment rails are moved toward each other until they reach a particular spacing, e.g., laterally inward-directed bulges, which reach axially inward toward the strip beyond this position of the lateral alignment rails and do not touch them, are not aligned. Therefore, even with an alignment using a device according to U.S. Pat. No. 4,769,104, unevenly shaped irregularities of the side edge courses of the two side edges relative to each other remain and, consequently, curvilinear symmetry axes also remain. To align the tips of the belt construction strip, a first mechanical pivoting lever is swiveled, which is pivoted from the outside of the side edge toward the front-most tip of the side edge. The first mechanical pivoting lever only contacts the tip in the front end region of the tip. The arm presses the front end of the tip axially inward in order to align the side edge in the tip. Then, the first mechanical pivoting lever is pivoted away from the side edge. A second mechanical arm, which extends over an entire width of the belt construction strip, is pivoted toward the front edge and is utilized to straighten the front edge by virtue of the fact that, with further pivoting, it presses against the front edge like a mechanical stop. The rubber material along the front edge and where the material is worked in the edge region is compressed and the front-most end of the tip of the belt construction strip is pressed axially outward once more so that it can once again leave the position halfway aligned by the first lever. The side edge in the tip region, which has only been pressed inward by the virtual point contact of the first lever against the front-most tip end for alignment, is otherwise not aligned in its course, even before the pivoting of the second lever. The actuation of the second arm produces slightly more curving, wherein as shown, it also runs the risk with its front end of the tip, of completely losing the alignment. Moreover, the front edge is straightened somewhat reliably by the second lever only if the pivoting lever acts as uniformly as possible, i.e. in the same alignment on the front edge. Due to the lever action of the pivoting lever, the force effects over the length of the front edge, though, vary as a function of the distance to the pivoting lever axis. Since the pivoting lever is intended to slightly compress the front edge material for alignment purposes, during the pivoting motion, the front edge part positioned closest to the pivot axis is compressed less than the front edge part positioned the furthest from the pivoting movement. The end of the tip, which is positioned farther from the pivot axis and absorbs the maximal lever action, is consequently also put under a great deal of stress and, therefore, the danger that this end will abandon its alignment position produced by the first lever is additionally increased. Tips of a belt construction strip that are laterally curved away from the belt construction strip can be only partially aligned, with the limitations and risks explained. However, tips that are formed as curved axially inward toward the belt construction strip cannot be aligned via this method. Already the first lever arm either does not come into contact with the side edge or it is pivoted until it bends the tip further inward. The second lever arm then pivots inward and presses directly against the inwardly bent end of the tip and finally squeezes the end region of the tip. With curvatures of this kind, the danger of the original curvature being amplified further and possibly irreparably compressed cannot be prevented with a device according to U.S. Pat. No. 4,769,104.

The device according to U.S. Pat. No. 4,769,104 consequently permits a limited alignment of side edges in the region of the main part of a belt construction strip, and a limited ability to align the front edge of the belt construction strip. A particular, predetermined contour of the side edge and a tip of the belt construction strip cannot be adjusted by this system. It is also not possible in the alignment to take into account possible subsequent deformations to be expected after the alignment on the basis of empirical values by deliberate pre-deformations so that, with the occurrence of the subsequent deformations, these pre-deformations are compensated for by counteracting, previously adjusted deformations and produce a desired form.

The device contains a large number of individual mechanical parts having an independent mechanical device for aligning the front tip and a device for independently aligning the rear tip, as well as independent mechanical devices for processing the main part. The large number of lateral mechanical force effects, moreover, increase the danger that other undesirable deformations are produced by lateral friction contact with the belt construction strip.

SUMMARY OF THE INVENTION

The present invention, therefore, develops a process and a device of the type generally discussed above which permits a belt construction strip to be delivered to a processing device, e.g., a belt construction drum, so that the construction strip can be safely processed and the quality of the belt is improved in the pneumatic vehicle tire.

The present invention provides a process and device for achieving the above-noted goal. The lateral alignment, without lateral stops, may reduce the danger of lateral force effects on the side edge and, consequently, may reduce the danger of undesirable deformations. To a large extent, this additionally prevents the danger of the production of material aggregations in the side edge region like the ones produced by mechanical stops. This eliminates a simple transfer of the irregularities in the side edge course to irregularities in the thickness course of the side edge and uniformity problems of the tire which are produced by them. In a process step of the present invention, a front tip of the belt construction strip may be aligned with regard to its form and its lateral position, and in another process step of the present invention, a rearward tip of the belt construction strip may be aligned with regard to its form and its lateral position. In this manner, the process ensures that the front and rear tips may be laterally positioned and shaped. A further process step, occurring between the above-noted steps, ensures that a main part of the belt construction strip, i.e., between the front and rear tips, may also be aligned with regard to its lateral position. The course of the process may permit an alignment of the front part and then, in accordance with the order in the feed direction and in agreement with the already aligned position of the front edge part, for the time being permits a matched alignment of the main part and then an alignment of the rear part matched to this. By aligning both the shape and the lateral position of the front and rear edge, the present invention ensures that the front edge and the rear edge obtain both the desired lateral position and the desired front and rear contour for further processing. This improves processability and spliceability for processing on a belt construction drum. With the belt construction drum, the present invention ensures that the front and rear edges can be spliced to each other in a functionally reliable manner, in which the main part is likewise aligned. This improves the quality of the belt in the pneumatic vehicle tire.

The course of the process discussed above permits alignment of the belt construction strip in accordance with the different requirements for the tips and the main part, actually in accordance with the feed process, i.e. first, the front part is aligned, then the main part, and then the rear part.

As long as belt construction strip material is found in the detection region of the sensors, the process according to the features of present invention permits a precise determination of an actual position of the side edge sections located in the detection region during the entire feed and a comparison, with set point values, for the position of the section of the belt construction strip, in terms of the feed direction, located in the detection region of the sensors. Further, by corresponding readjustment of the side edge position, as a function of the determined deviations of actual values and set point values, the present invention permits individual alignment in accordance with the different requirements over the length of the belt construction strip.

The process according to the features the present invention may also permit a reliable, simple alignment of the belt construction strip in the feed region. This is achieved by aligning the front tip and the rear tip relative to the side edges for processing purposes. For example, in their side edge position, the front and rear tips may be correspondingly adapted to the actual requirements in a processing that is as precise as possible, and, in their form, are adapted to the lateral position desired for the processing. Accordingly, when splicing on a belt construction drum, lateral movement of the front and rear edge regions can be prevented to a large extent. Since the deformation takes place without lateral mechanical stops, a more evened-out alignment takes place so that the front edge and the rear edge are also evened out. The main part located between the front and rear tips may be aligned according to the requirements of the belt construction strip in the pneumatic vehicle tire. In contrast to purely two-sided alignment of side edges with mechanical guides, which can produce asymmetrical distributions of the cord material in relation to the equatorial plane in the pneumatic vehicle tire, the lateral alignment symmetrical to the center provides that the steel cord material in the pneumatic vehicle tire is distributed in a largely symmetrical manner relative to the equatorial plane. This improves the driving properties and the reliability of the pneumatic vehicle tire.

The process according to the further features of the present invention, provides a preferable process for aligning the front tip in which the individual parts of the tip are successively handled one after the other in their position in the feed direction in accordance with the feed motion. After the lateral alignment of the front end of the front tip, the lateral position of the tip is adjusted for subsequent spliceability. If the side edge position of this front tip end is unchanged, the tip is now moved with its subsequent region so that in the tip region disposed after the front end, the side edge position of the front tip is pivoted in its angular position around the tip end. The pivoting takes place until the side edge of the front tip assumes the desired position of the side edge of the front tip. In this manner, not only is the end of the tip laterally positioned in an exact manner for processing, but the tip is also deformed into its desired shape by the rotary movement around the tip end. The entire tip may be pivoted laterally around the end so that the front edge also experiences the deformation and consequently the aligning motion. In this manner, the front edge is evened out in its course so that the spliceability is improved.

The process according to the additional features of the present invention provides a preferred process for aligning a belt construction strip. In accordance with the order of the individual sections in the feed direction, the belt strip is first fed until the front end of the front tip is detected by a sensor. Then the belt construction strip is moved laterally until the front end reaches the aligned position. Then a securing contact is produced between the front tip and the second conveying device so that the front end does not move laterally with the subsequent movement of the first conveying device. Via the subsequent lateral movement of the first conveying device, the front tip is pivoted around the secured end until the side edge of the front tip reaches its desired position, which it maintains even in the following. By detection of both side edges by the sensor device during the feeding of the main part, the main part may be aligned in such a way that the two side edge courses are essentially symmetrical to an axis that extends in the feed direction. This provides that the two side edge courses can in fact have irregularities, however, the two irregularities on both side edges may be substantially symmetrical to an axis that runs in the feed direction, and consequently the steel cord material is essentially distributed symmetrical to this axis. After this, the rear tip may be aligned without changing the position of the main part aligned in this manner. Thus, by utilizing a single sensor device, which may be positioned in a region between two conveying devices, and by simply controlled movement of only the first conveying device, the front tip, the main part, and the rear tip may be aligned according to the respective requirements in these three sections of the belt construction strip in a structurally simple manner with comparatively few components.

Only the first conveying device is necessarily movable in a laterally controlled manner. Other additional components that act on the belt construction strip for lateral alignment are not necessary. The expenditure for manufacturing, maintenance, assembly, and quality control for these other components is not necessary. All of the required lateral alignment procedures can be detected and controlled using a single sensor device that is positioned between the two conveying devices.

The process according to further features of the present invention, provides that, in a simple manner and without additional devices, the rear tip may also aligned in a reliable manner. As soon as the rear tip enters the influence region of the sensors, the rear tip may be laterally moved relative to the preceding regions of the belt construction strip, which have already been aligned and are secured against lateral movement on the second conveying device. Thus, only the side edge of the rear tip is pivoted in its angular position relative to the secured regions of the belt construction strip. The lateral movement may be carried out until the side edge of the rear end of the belt construction strip corresponds to its desired position. Consequently, the rear tip is also optimally aligned with regard to the requirements of the processing, particularly on a belt construction drum. The side edge of the rear tip may correspond to the desired position for the side edge of the rear tip so that the rear tip may be prevented from laterally moving relative to a desired position in the processing device. As a result of the lateral alignment by the lateral movement of the first conveying device, without lateral stops, when the preceding belt construction strip region is secured against lateral movement, the entire rear tip may be aligned in its form and consequently, the rear edge may also be evened out in its course. The spliceability of the rear edge is consequently better.

The process according to still further features of present invention provides that even empirically known deformations in the processing, which may take place before placement of the belt onto the belt drum, upon placement of the belt construction strip onto the belt construction drum, or by the subsequent conveying to the processing device or to the belt construction drum after the alignment, and which deformations may further impair the belt construction strip in its alignment quality, have already been taken into account during the aligning process of the present invention. The alignment without fixed lateral stop contours permits a simple changing of the lateral desired contour of the front or rear tip, which desired contour is achieved by the alignment. In accordance with the deformations to be expected, the front tip or the rear tip may be aligned and pre-deformed by the measure of the expected deformation, albeit in an opposite direction of the expected deformation.

With the beginning of the deformation that is expected in the further course of the conveying or processing, or that is expected with the placement on the belt, the deformation combines with the previously adjusted deformation by the alignment. This improves the front edge or the rear edge in the laid state on the belt construction drum with regard to the quality of its side edge position or its shape.

Without other intermediate steps, the present invention provides that, in a single work station, the belt construction strip may be cut from the belt band material, aligned directly, and conveyed to the processing device. The process is particularly advantageous if the length of the belt construction strip to be cut off is detected by sensors for detecting the front edge of the belt construction strip in region of the second, i.e., subsequent, conveying device in the feed direction. In this manner, immediately after the production of an aligned belt construction strip, the cut length may be directly checked, so that inadmissible length deviations may be detected early. Accordingly, this substantially prevents surprises of the kind in which, after the belt construction strip is laid on the belt construction drum, the discovery is made that spaces between the front and rear edge of the belt construction strip on the belt construction drum do not permit a splice to be made.

For a conveyed belt construction strip that follows a conveyed belt construction strip, the actual side edge positions achieved in the adjustment of the previously conveyed belt construction strip may be utilized as set point values. Thus, values with favorable quality that have already been established immediately prior to the belt construction strip under alignment may be used as reference values for the desired position to be adjusted, the quality of the successively produced and aligned belt construction strips may be further evened out. At the beginning of the production and conveying of a belt construction strip, the first belt construction strip may be aligned using reference values for the desired positions of the side edges and these reference values may be based on empirical values. On the basis of the actual side edge positions obtained in the alignment of a respectively preceding belt construction may be consulted as reference values for the desired edge positions of the subsequently fed belt construction strips.

In a simple manner, a device for feeding and preparing a belt construction strip according to the features of the present invention may permits a reliable alignment of a belt construction strip in the three succeeding construction strip regions in the feed direction, i.e., the front tip, the main part, and the rear tip, as a function of the necessary criteria respectively required for alignment in these three components. The device includes two conveying devices successively positioned one after the other. The upstream conveying device, with respect to the feed direction, is provided to be laterally movable in a controlled fashion, to permit conveyance in the feed direction, and to impart lateral movement in a downstream region of the belt construction strip in conveying contact with the downstream conveying device. Thus, the device may laterally move portions of the belt construction strip relative to the already aligned parts, which are in conveying contact with the second conveying device. The measure of the lateral movement of the first conveying device for the purpose of lateral alignment may be determined as a function of, or in accordance with, the positions of the side edges of the belt construction strip detected by the sensor device positioned between the two conveying devices. The first conveying device may be laterally adjusted in accordance with the measurement for the lateral movement. A securing device secures the front tip of the belt construction strip in a controlled manner in the region of the second conveying device to permit the front tip, which is still touching the second conveying device with slight lateral contact, to be secured against lateral movement. The sensor device, the drive device, and the controlled securing device are coupled to impart and control lateral movement of the first conveying device. In this manner, the front tip of the belt construction strip in the feed direction may be aligned in its form and position, the main part of the belt construction strip may be symmetrically aligned in its form and lateral position, and the rear tip, that points counter to the feed direction, may be aligned with regard to its shape and its lateral position. Thus, alignment of the belt construction strip may be achieved without changing the feed direction, and only via lateral movement of the upstream conveying device in accordance with measured values of the side edges that are detected by the sensor device. The device may be utilized to align the front tip of the belt construction strip by its side edge and its form so that this fulfills the requirements for a precise processing, particularly in a splicing in a belt construction drum. The device may also be utilized to align the main part so that it is optimized for use in pneumatic vehicle tires and is formed with a cord distribution that is symmetrical with regard to the equatorial plane. Further, the device may be utilized to align the rear tip so that it correctly assumes the alignment in position and form required for processing, in particular on the belt construction drum.

Accordingly, the present invention is directed to a process for transporting a belt construction strip having parallel reinforcing members embedded in a belt construction material for forming a belt for a pneumatic vehicle tire. The process may include feeding the belt construction strip in a feed direction toward a subsequent processing device, such that the feed direction is oblique to the reinforcing members and the belt construction strip includes two lateral sides extending in the feed direction, forming a front edge on a front end of the belt construction strip in the feed direction and a rear edge on a rear end of the belt construction strip in the feed direction, such that the front and rear edges extend obliquely to the feed direction and substantially parallel to the reinforcing members, defining a front tip from a portion of the belt construction strip enclosed by the front edge and one of the two lateral sides, defining a rear tip from a portion of the belt construction strip enclosed by rear edge and the other of the two lateral sides, and feeding the belt construction strip along at least two conveying devices. The process may also include laterally aligning the front tip in accordance with its form and position, laterally aligning the belt construction strip, in a region between the front tip and the rear tip, in accordance with its position, and laterally aligning the rear tip in accordance with its form and position.

According to another feature of the present invention, the process may also include positioning sensors adjacent to the two lateral sides of the belt construction strip, detecting a position of at least one of the front edge and rear edge, and adjusting a position of the belt construction strip in accordance with the detected position of the two lateral sides. Further, the process may include detecting a side edge position of the front tip with the sensor positioned adjacent the lateral side forming the front tip, aligning the front tip in a position in accordance with detected side edge position, and deforming the front tip so that a lateral edge of a region of the belt construction strip in a vicinity of the front tip corresponds to a desired lateral edge alignment position and contour. The process also includes detecting a side edge course of the belt construction strip located between the front tip and the rear tip, aligning the belt construction strip, located between the front tip and the rear tip, to be symmetrical centered relative to an axis in the feed direction. The process may also include detecting a side edge position of the rear tip with the sensor positioned adjacent the lateral side forming the rear tip, aligning the rear tip in a position in accordance with the detected side edge position, and deforming the rear tip so that a lateral edge of a region of the belt construction strip in a vicinity of the rear tip corresponds to a desired lateral edge alignment position and contour.

According to another feature of the present invention, the process may also include laterally moving the front end of the front tip into a desired lateral alignment position, and securing the front end against lateral movement. When a side edge position of the front end is unchanged and is secured against lateral movement caused by lateral movement of portions of the belt construction strip positioned after it in the feed direction, the process further includes changing an angular position of a lateral edge position of the front tip relative to the feed direction until the lateral edge of the front tip is assumes a desired angular course.

According to a further feature of the present invention, the process includes feeding the belt construction strip with a first conveying device, detecting the front end of the front tip with a sensor for detecting the side edge position in a transition region to a second conveying device, non-continuously feeding the belt construction strip, and laterally moving the belt construction strip until the side edge position of the front end detected by the sensor corresponds to a desired position of the side edge of the front end. The process further includes feeding the belt construction strip until holding contact is made with the second conveying device that secures the belt construction strip against lateral movement, and, upon making clinging contact, interrupting the feeding, and laterally moving the belt construction strip via the first conveying device until the side edge position of the front tip detected by the sensor corresponds to the desired position. The process also includes conveying the belt construction strip and detecting the other lateral edge of the belt construction strip with a sensor for detecting the side edge position located in the transition region to the second conveying device, and laterally moving the first conveying device in a manner controlled as a function of actual lateral positions of the two side edges so that side edge courses are substantially symmetrical to an axis extending in the feed direction. When the belt construction strip is conveyed until a side edge leaves the sensor detecting region in the feed direction, the rear tip is thereby aligned.

According to a still further feature of the present invention, process may also include lowering a support roll in a controlled manner onto the tip of the belt construction strip in the region of the second conveying device to exhibit holding contact between the belt construction strip and the second conveying device, and raising the support roll before aligning the portion of the belt construction strip between the front tip and the rear tip. Further, the process may include lowering a support roll in a controlled manner onto the front tip in the region of the first conveying device to exhibit holding contact between the belt construction strip and the first conveying device, and raising the support roll before aligning the portion of the belt construction strip between the front tip and the rear tip.

According to still another feature of the present invention, after the side edge has left the sensor detection region in the feed direction, the process further includes detecting a side edge position of the other side edge, laterally moving the rear tip relative to the belt construction strip secured against lateral movement on the second conveying device via laterally moving the first conveying device, the rear tip being laterally moved in accordance with the detected position, and positioning the rear tip in a desired position.

According to another feature of the present invention, after the portion of the belt construction strip between the front tip and the rear tip has left the transition region between the first and second conveying devices, the process may further include lowering support rolls onto the rear tip to secure holding contact, the lowering of the support rolls including lowering one support roll in a region of the first conveying device and lowering another support roll in a region of the second conveying device, and raising the support rolls when the rear end of the rear tip has left the transition region between the first and second conveying devices.

According to a further feature of the present invention, a desired side edge position for at least one of the front tip and the rear tip deviates from a straight line in the feed direction by an amount of a subsequent side edge deformation expected after the alignment.

According to still another feature of the present invention, the process may include cutting the belt construction strip on a first conveying device from a belt band material, thereby forming the rear edge of the belt construction strip, detecting a desired length of the belt construction strip to be cut off via sensors for detecting a front edge of the belt construction strip in the region of a second conveying device positioned downstream the first conveying device, and actuating the cutting of the belt construction strip in accordance with the detection of the front edge.

According to a still further feature of the present invention, in conveying subsequent belt construction strips, the process further including utilizing actual side edge positions of a previously adjusted conveyed belt construction strip are used as set point values. When the first belt construction strip is processed, the process including predetermining reference values as set point values for desired edge positions of the two tips.

According to a further feature of the present invention, the parallel reinforcing members including steel.

According to another feature of the present invention, the subsequent processing device including a belt construction drum.

According to still another feature of the present invention, the front tip and the rear tip forming acute angles. The acute angles being between approximately 10° to 35°.

According to another feature of the present invention, the at least two conveying devices may include continuous conveyor belts successively positioned in the feed direction and laterally aligned without a lateral stop.

According to still another feature of the present invention, the belt construction material may include rubber.

The present invention may also be directed to a device for conveying and preparing a belt construction strip having parallel reinforcing members embedded in a belt construction material for processing in a subsequent processing device. The device may include first and second conveying devices successively positioned in the feed direction without a lateral stop for the belt construction strip, the first and second conveying devices providing lateral alignment of the belt construction strip, a drive device that laterally moves the first conveying device relative to the feed direction, a sensor device that includes at least two sensors detecting a position of side edges of the belt construction strip, a holding device that holds a front tip of the belt construction strip in a controlled manner in a region of the second conveying device, the laterally movable first conveying device being positioned upstream of the second conveying device relative to the feed direction, and the sensor device positioned to determine at least one of alignment of an edge of the belt construction strip and alignment of a center of the belt construction strip.

According to another feature of the present invention, the device may also include a dividing device for cutting the belt construction strip off from a belt band material supply, the dividing device being positioned on the first conveying device.

According to still another feature of the present invention, the device may also include an additional sensor positioned adjacent the second conveying device to detect a front edge of the band construction strip and to determine a length of the band construction strip between the front edge and the dividing device. The dividing device may include a cutting device actuatable by a determination that the length of the band construction strip between the front edge and the dividing device corresponds to a desired length.

According to yet another feature of the present invention, the holding device may include a support roll being rotatably supported and mounted to be raised and lowered relative to the second conveying device. The support roll may be lowered for aligning a position of the edge of the belt construction strip and may exert a sufficient force to enhance a frictional force between the belt construction strip and the second conveying device secure the front tip during alignment. The support roll may be raised for aligning the center of the belt construction strip. Further, the holding device may also include a support roll being rotatably supported and mounted to be raised and lowered relative to the first conveying device. The support roll may be lowered for aligning a position of the edge of the belt construction strip and may exert a sufficient force to enhance a frictional force between the belt construction strip and the first conveying device secure the front tip during alignment. The support roll may be raised for aligning the center of the belt construction strip.

Other exemplary embodiments and advantages of the present invention may be ascertained by reviewing the present disclosure and the accompanying drawing figures.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Figure 1:
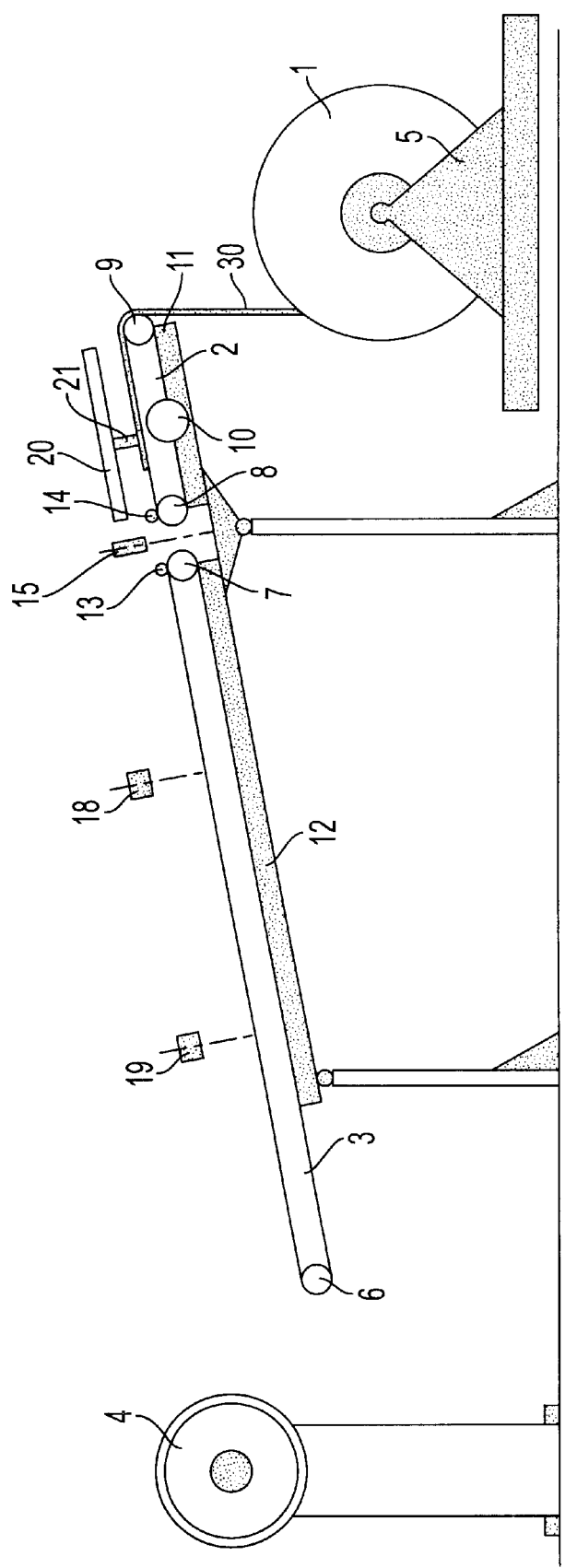
FIG. 1 illustrates a schematic side view of a conveying and aligning device according to the present invention.

FIG. 1 illustrates a conveyor table including a first continuous conveyor belt 2 for transporting a continuous belt construction band 30 conveyed or paid out from a belt construction band storage roll 1 rotatably supported on a stand 5. Belt construction strips 35 may be cut on continuous conveyor belt 2 with a knife 21, e.g., a dividing device of a known type. Belt construction strips 35 may be conveyed to a belt construction drum 4 of a known type via first continuous conveyor belt 2 and a second continuous conveyor belt 3, which is positioned downstream of continuous conveyor belt 2 in a feed direction. Belt construction strips 35 may be laid on the belt construction drum to construct the belt of a pneumatic vehicle tire. Continuous conveyor belt 2 may be formed to run around deflection rolls 8 and 9, which may be parallelly aligned with each other, crosswise to the feed direction, and rotatably supported with their shafts coupled to a table slab 11 of the conveyor table. At least one of deflection rolls 8 and 9 may be rotatably driven in a known manner by a controlled drive motor (not shown). Table slab 11 may be supported in the conveyor table for lateral movement relative to the feed direction. Table slab 11 and, consequently, continuous conveying belt 2 may have their lateral positions adjusted in a controlled manner via an adjusting drive 10 of a known type, e.g., an adjusting spindle driven by a servomotor.

Figure 2A:
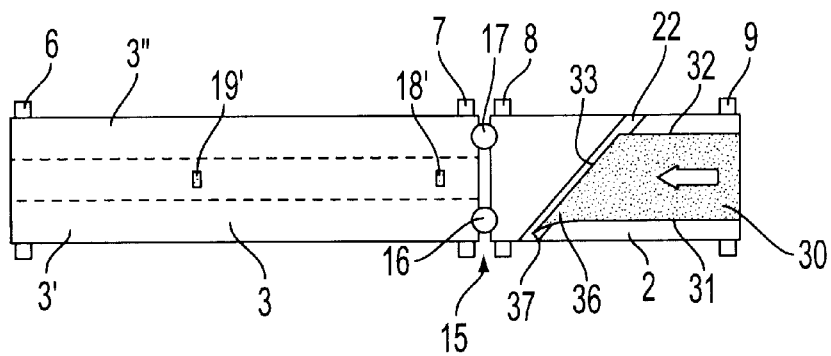
FIGS. 2a–2i illustrate a schematic top view of a course of the conveying and aligning the belt construction strips of the present invention.

Continuous conveyor belt 3 may be formed to run around deflection rolls 7 and 6, which may be parallelly aligned with each other, crosswise to the feed direction, and rotatably supported with their shafts coupled to a table slab 12 of the conveyor table. At least one of deflection rolls 6 and 7, e.g., deflection roll 6, may be in driving contact with a controlled drive motor (not shown). A sensor device 15 with two sensors 16 and 17 may be positioned between two continuous conveyor belts 2 and 3 and above the conveyor plane. Sensors 16 and 17 may be equally laterally spacing from a belt center of continuous conveyor belt 3. Sensors 17 and 16 may be coupled to a control unit that controls adjusting drive 10 in a known manner. Sensors 16 and 17 may be, e.g., CCD cameras for detecting lateral sheet edges 31 and 32 of the belt construction material. Two sensor systems 18 and 19, which may be of a known type, for detecting a front edge of the conveyed belt construction material may be arranged successively, one after the other, in a region of the second continuous conveyor belt 3. As shown, e.g., in FIG. 1, sensor systems 18 and 19 may be located above the conveyor plane as, e.g., CCD cameras or light barriers. It is also conceivable that the second continuous conveying belt may be formed from two substantially parallel conveyor belts 3' and 3" that are continuously guided around deflection rolls 6 and 7, as shown, e.g., in dashed lines in FIG. 2a. Further, as depicted in FIG. 2a, it is conceivable to locate sensor systems 18' and 19' beneath the conveyor plane and between continuous belts 3' and 3'. Sensor systems 18 and 19 may be formed as light barriers to detect the presence of a front edge 33 of the belt construction material when the belt construction material is conveyed along conveyor belts 3' and 3".

Figure 2B:
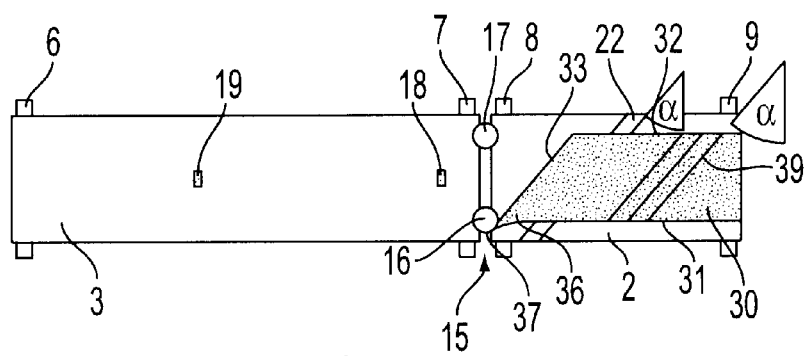

Belt construction band 30, which may be unwound from belt construction band storage roll 1 and conveyed by first continuous conveyor belt 2 on its upper feed side in the conveyor plane, may be produced in a known manner, e.g., in which parallel steel cords 39, of which three such cords are schematically represented in FIG. 2b, may be embedded in the rubber. Steel cords 39 may be positioned to form an acute angle a between, e.g., approximately 10° and 35°, and, preferably, 20°, relative to the lateral direction of the conveyor belt. On the upper feed side of first continuous conveyor belt 2, a cutting strip 22 may extend crosswise to the feed direction to form an acute angle a parallel to the alignment of steel cords 39, however, cutting strip 22 may be positioned above the belt construction band 30. Cutting strip 22 may include a rolling knife 21 of a known type movably mounted for cutting belt construction band 30.

Cutting strip 22 may be positioned above continuous conveyor belt 2 so that belt construction band 30 is fed by continuous conveyor belt 2 past cutting strip 22. Belt construction band 30 may be conveyed in the feed direction by continuous conveyor belts 2 and 3 until a belt construction strip 35, i.e., a belt construction strip having a length corresponding to a desired length for constructing or building a belt layer of the belt on belt construction drum 4, has passed cutting strip 22. The conveyors may be stopped and rolling knife 21 may be laterally rolled over conveyor belt 2 at the angle a on cutting strip 22. In this manner, belt construction strip 35 may be cut off from belt construction band 30. This gives belt construction strip 35 a diagonal rear edge 34 and gives belt construction band 30, and consequently a next belt construction strip 35, a diagonal front edge 33. A front tip 36 of a subsequent belt construction band, as well as a rear tip 38 of the current belt construction strip 35 may be curved, e.g., via the cutting motion, which has been carried out parallel to the alignment of steel cords 39 at the angle α. No later than after the cut, front edge 33 and rear edge 34 may be intensely curved in a region of tips 36 and 38, just like side edges 31 and 32. Side edges 31 and 32 of belt construction band 30 or belt construction strip 35 may generally exhibit mutually uneven irregularities in the edge course which may be manufacture conditional, storage-induced, and/or are caused by the conveyance to the first continuous conveyor belt 2.

The process of the present invention further includes conveying and aligning side edges 31 and 32 and front edge 33 of belt construction band 30 on conveyor belts 2 and 3. FIGS. 2a–2i show phases of an exemplary embodiment of the process. FIG. 2a illustrates an initial position in which belt construction band 30 rests, with front edge 33 produced on cutting strip 22 via a dividing device 20. The cut may be performed or produced with a stopped conveyor belt 2. Movement of belt construction band 30, after cutting front edge 33, may be effected in the feed direction, as depicted in FIG. 2a with the arrow, via continuous conveyor belt 2 until a front end region 37 of front tip 36 is detected by side edge sensor 16.

Figure 2C:
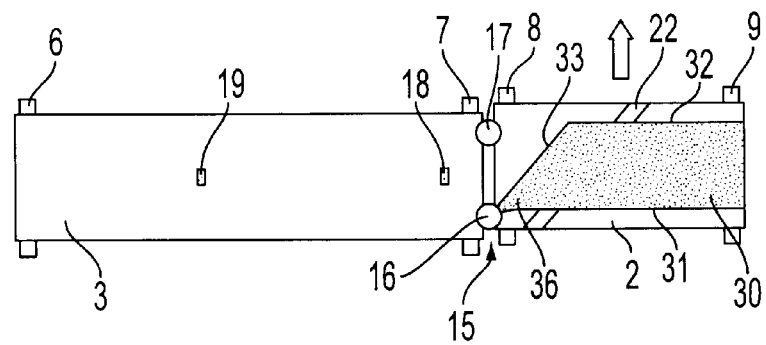
Figure 2D:
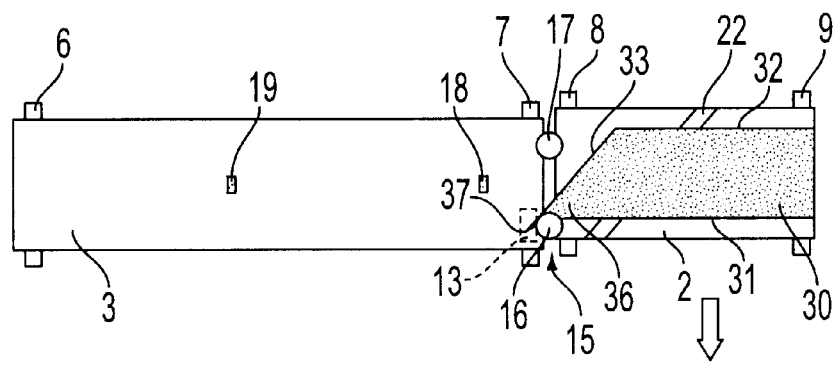

Upon sensing front end region 37, sensor 16 signals the control for the drive motor for conveyor table 2 to stop, as shown in FIG. 2b. The control device (not shown) for controlling adjusting drive 10 instructs adjusting drive 10 to move, e.g., lateral to the feed direction, conveyor table 11, if necessary, to align the position of side edge 31 of front tip 37 sensed by sensor 16 with a predetermined set point value for the side edge position of side edge 31, as shown in FIG. 2c. After the phase depicted in FIG. 2c, belt construction band 30 may be conveyed in the feed direction via conveyor belt 2 until tip 36 reaches an influence region of a support roll 13, as shown in FIG. 2d. Support roll 13 may be rotatably supported above conveyor belt 3, parallel to deflection roll 7, and may be further pivotably supported for up and down movement. Support roll 13 may be lowered onto tip 36 to enhance a frictional force acting between an upper feed side of second conveyor belt 3 and tip 36, which has been moved to rest on conveyor belt 3. Support roll 13, while permitting conveyance or movement of belt construction strip 35 in the feed direction, prevents lateral movement of tip 36 relative to the upper feed side of conveyor belt 3.

In a next phase of the present invention, conveyor table 11 may be laterally moved via adjusting drive 10 until a portion of side edge 31, being detected by side edge sensor 16 and being located in a vicinity of front tip 36, but in front of the front end region in the feed direction, may be pivoted around the end of tip 36, which has been secured against lateral movement. Conveyor table 11 may be moved until the position of the portion of side edge 31 is aligned with a predetermined side edge position for side edge 31 of front tip 36. In this manner, front tip 36 may be laterally aligned and, with respect to its shape, may also be deformed into a desired shape.

Figure 2E:
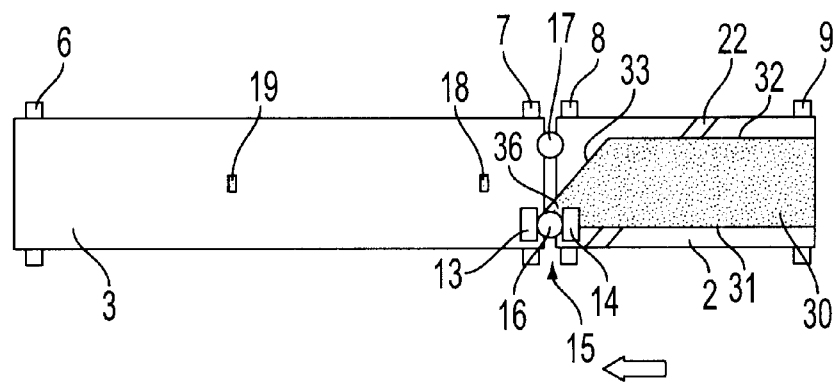

In order to ensure the form and alignment of front tip 36, another securing roll 14, which may be located above deflection roll 8 of first conveyor belt 2 and may be rotatably supported around an axis parallel to the axis of deflection roll 8, may be lowered onto the side region of front tip 36 along side edge 31, as shown in FIG. 2e. In this manner, an adhesive action between conveyor belt 2 and belt construction band 30 may be intensified. Further, a conveyance of belt construction band 30 in the feed direction may be permitted, while lateral movement of the aligned end relative to conveyor belt 2 may be prevented.

Figure 2F:
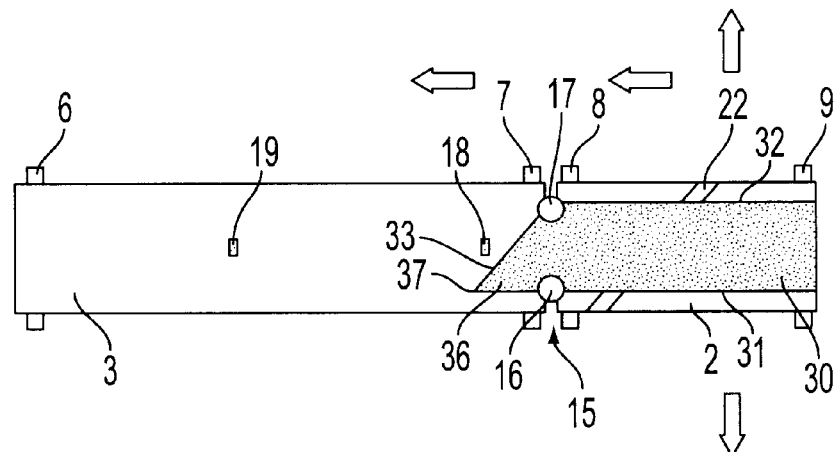

In a next phase of the exemplary embodiment of FIGS. 2a–2i, belt construction band 30 may be synchronously fed via driven conveyor belts 2 and 3 until sensor 17 detects a side edge 32 of belt construction band 30. During this conveyance of belt construction band 30, a position of side edge 31 is continuously detected by the sensor 16 and table 11 may be appropriately and correspondingly moved until an actual position of side edge 31 in the vicinity of sensor 16 corresponds to the desired position. As soon as front tip 36 has been sufficiently moved onto conveyor belt 3 to exhibit an adequate adhesive friction between conveyor belt 3 and belt construction band 30 without the aid of support rolls 13 and 14, thus, to secure the lateral position of belt construction band 30 on conveyor belt 3, support rolls 13 and 14 may be raised to end contact with belt construction band 30, as shown in FIG. 2f. Up to this point, an alignment mode for aligning front tip 36 is generally a side edge aligning mode, i.e., a mode with which alignment is performed so that side edge 31 assumes a predetermined desired position and a predetermined desired course along conveyor belt 3.

In a next phase, the process of the present invention may switch from a side edge alignment mode to a center operating mode. Of course, belt construction band 30 may still be continuously conveyed via synchronously driven conveyor belts 2 and 3, in which sensor 16 still continues to continuously detect the position of side edge 31 being guided past the sensing position between conveyor belts 2 and 3, and the sensor 17 still continues to continuously detect side edge 32 being guided past the sensing position between the conveyor belts 2 and 3. However, in accordance with measurement values for each longitudinal position of belt construction band 30 detected by sensors 16 and 17, a width of belt construction band 30 at the respective longitudinal position may be detected by sensors 16 and 17. From the detected width, a center of belt construction band 30, at the longitudinal position of belt construction band 30, may be determined and compared to a predetermined desired position for a center of belt construction band 30 at this respective longitudinal position. In accordance with a detected deviation of a desired center position from the measured or actual position of the width center, adjusting drive 10 may be controlled to respectively move the table in accordance with the measure of the deviation, i.e., until the desired center position of belt construction band 30 corresponds to the actual position in this respective longitudinal position. In this way, in a main part of belt construction band 30, which is located after front tip 36 and whose side edges, i.e., side edges 31 and 32, have been detected, the two side edges may, in fact, still be curvilinear after alignment, but may be symmetrical to the center line of belt construction band 35 that is to be conveyed further on conveyor belt 2.

As soon as front edge 33 is detected by first length sensor 18, a counting procedure for the material division may be triggered. Belt construction band 30 may be further continuously conveyed in the center guidance operating mode. In accordance with a desired length of belt construction strip 35 to be cut off from belt construction belt 30, and in accordance with a set conveying speed of conveyor belts 2 and 3 and a counting speed, conveyance may be continued until the counting procedure has reached a number which indicates that a distance from front edge 33 to cutting line 22 of the rolling knife 21 corresponds to the desired length of belt construction strip 35. Once this distance is determined, the feed may be stopped. Rolling knife 21 of dividing device 20 may be lowered and rolled along, i.e., parallel to, cutting strip 22 to cut off belt construction strip 35 from belt construction band 30. Belt construction strip 35 may be given a rear edge 34, which, together with side edge 32 of belt construction strip 35, produces or forms a rear tip 38, which exhibits an acute angle α. No later than at a time of cutting rear edge 34, rear tip 38, rear edge 34, and side edge 32 in a vicinity of the rear tip 38 may be frequently deformed.

Figure 2G:
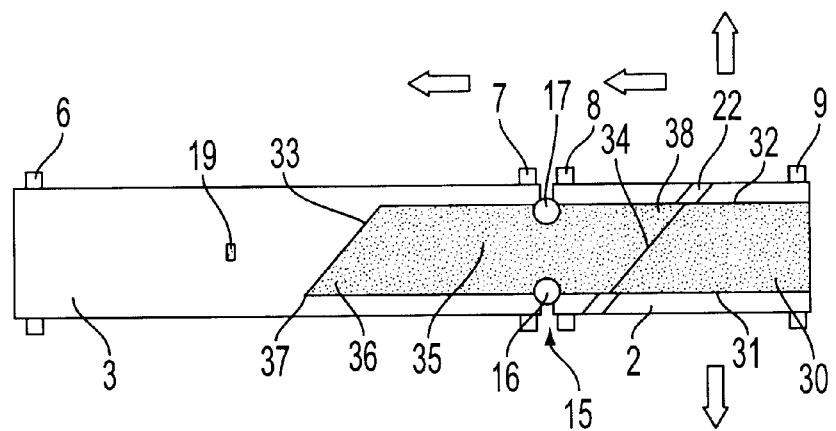

FIG. 2g illustrates a remaining belt construction band 30 and the just-cut belt construction strip 35. However, it is noted that this illustration is somewhat simplified in that the figure does not depict the curvature. After belt construction strip 35 is cut off from belt construction band 30, belt construction strip 35 may be conveyed further in the feed direction via synchronously driven conveyor belts 2 and 3, operating in the center guidance operating mode, until side edge 31 leaves the gap between conveyor belts 2 and 3 and, consequently, leaves the detection region of sensor 16.

Figure 2H:
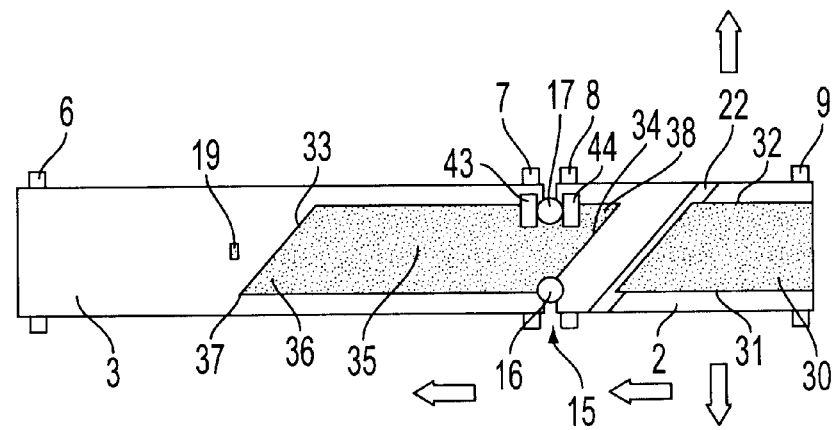

Two additional support rolls 43 and 44, which may be raised and lowered in a controlled fashion, are positioned parallel to deflection rolls 7 and 8 and positioned above deflection rolls 7 and 8 to be lowered onto side edge 32 to enhance the friction contact between belt construction band 35 and conveyor belts 2 and 3, as shown in FIG. 2h. Support rolls 43 and 44 may also be used to secure belt construction strip 35 against lateral movement on the conveyor belts in a vicinity of deflection rolls 7 and 8.

Figure 2I:
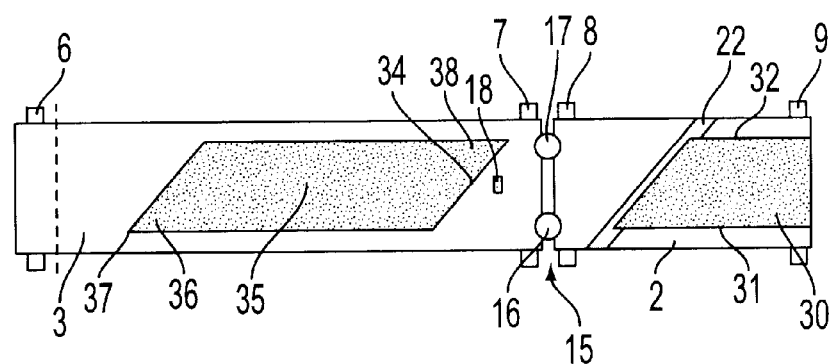

The alignment operating mode may now be switched from the center guidance operating mode to the side edge guidance operating mode. Conveyor belts 2 and 3 may convey belt construction strip 35 further in the feed direction. Sensor 17 may continue to continuously detect the position of side edge 32. In accordance with the respectively detected side edge position at each measured longitudinal position of belt construction strip 35, adjusting device 10 may laterally adjust or position table 11 until side edge 32, which is secured in the lateral direction against lateral slippage between deflection roll 7 and support roll 43 and between deflection roll 8 and support roll 44, is moved counter to the detected measurement of the deviation of the actual side edge position from the desired side edge position. Consequently, side edge 32 may be aligned in its desired contour and rear side tip 38 may be deformed into its desired form. As soon as the rear end of tip 38 has left gap region between conveyor belts 2 and 3, and has left the detection region of sensor 17, the alignment process is completed. Accordingly, support rolls 43 and 44 may be lifted, as depicted in FIG. 2i.

It is, however, also conceivable that support rolls 43 and 44 may be lowered only if belt construction strip 35 has left the desired position depicted in FIG. 2h. Of course, this alternative is viable as long as sufficient adhesive friction exits between belt construction strip 35 and conveyor belt 2, thus, preventing lateral movement of rear tip 38 relative to conveyor belt 2.

Another front edge sensor 19 may be positioned for further testing the cut-off length of belt construction strip 35. In operation, as soon as front edge sensor 19 detects front edge 33, another counting procedure may be actuated. The counting procedure continues until rear edge 34 passes front edge sensor 18. By comparing the counting duration required for the conveyance of belt construction strip 25, e.g., as a function of conveying speed and counting speed, a verification may be made as to whether the desired length has been properly adjusted. If the length deviates from the desired length measurement by more than a predetermined tolerance magnitude, the cut belt construction strip may be removed. Otherwise, belt construction strip 35 may be further conveyed in the direction of belt construction drum 4 and may be constructed directly in a form aligned in this manner.

After the process arrives in the phase depicted in FIG. 2d, i.e., in which tip 37 is secured against lateral movement between support roll 13 and deflection roll 7, thereby securing the alignment motion of front tip 36, it is also conceivable to initially lower support roll 14 so that front tip 36 may be secured against lateral movement between support roll 14 and deflection roll 8. Then, table 11 may be moved via adjusting device 10 until front tip 36, which is clamped in this manner between deflection roll 7 and support roll 13 and between deflection roll 8 and support roll 14, arrives with its side edge in the desired position of the side edge.

It is also conceivable that side edge 31 or side edge 32 may be aligned to form a straight line parallel to the feed direction. It is also conceivable to align side edge 31 or side edge 32 to produce an intentional deviation from a parallel straight line and then to deliberately counteract the expected deformation produced. Therefore, when there is an expected deformation, e.g., of side edge 31 toward the left in the feed direction, this deformation may be counteracted by correspondingly deliberately aligning side edge 31 toward the right. In this manner, belt construction band 35 may be a desired linear alignment on belt construction drum 4.

With the conveyance of belt construction strips 35, which already correspond in their alignment to a desired alignment, the side edge positions measured by sensors 16 and 17 and the width centers detected in the main part correspond to the desired courses. Belt construction strips 35 of this kind may be conveyed to belt construction drum 4 without an aligning movement of conveyor belt 2.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

REFERENCE LIST 1 belt storage roll
2 continuous conveyor belt
3 continuous conveyor belt
4 belt construction drum
5 stand
6 deflection roll
7 deflection roll
8 deflection roll
9 deflection roll
10 actuating drive
11 table
12 table
13 support roll
14 support roll
15 sensor device
16 side edge sensor
17 side edge sensor
18 front edge sensor 19 front edge sensor
20 dividing mechanism
21 rolling knife
22 cutting strip
30 belt construction band
31 side edge
32 side edge
33 front edge
34 rear edge
35 belt construction strip
36 front tip
37 end region
38 rear tip
39 steel cord
43 support roll
44 support roll

What is claimed is:

1. A process for transporting a belt construction strip having parallel reinforcing members embedded in a belt construction material for forming a belt for a pneumatic vehicle tire in an apparatus that includes a first and second conveying device arranged to transport the belt construction strip in a feed direction, and the first conveying device is arranged for movement in a direction lateral to the feed direction, comprising:

feeding the belt construction strip in the feed direction over the first and second conveying devices toward a subsequent processing device, the feed direction being oblique to the reinforcing members and the belt construction strip including two lateral sides extending in the feed direction;

forming a front edge on a front end of the belt construction strip in the feed direction and a rear edge on a rear end of the belt construction strip in the feed direction, the front and rear edges extending obliquely to the feed direction and substantially parallel to the reinforcing members;

defining a front tip from a portion of the belt construction strip enclosed by the front edge and one of the two lateral sides;

defining a rear tip from a portion of the belt construction strip enclosed by the rear edge and the other of the two lateral sides;

laterally moving the first conveying device in a direction lateral to the feed direction to align the front tip at a specified lateral position;

laterally aligning the belt construction strip, in a region between the front tip and the rear tip, in accordance with its position and without a lateral stop to guide either of the lateral sides; and laterally moving the first conveying device in a direction lateral to the feed direction to align the rear tip at a specified position.

2. The process according to claim 1, further comprising:
positioning sensors adjacent to the two lateral sides of the belt construction strip; and
detecting a position of at least one of the front edge and rear edge,
wherein the lateral moving of the first conveying device further aligns a position of the belt construction strip in accordance with the position of the at least one of the front edge and rear edge detected by the sensors.

3. The process according to claim 2, further comprising:
detecting a side edge position of the front tip with the sensor positioned adjacent the lateral side forming the front tip;

aligning the front tip in a position in accordance with the detected side edge position by the lateral moving of the first conveying device, wherein the front tip is deformed so that a lateral edge of a region of the belt construction strip in a vicinity of the front tip corresponds to a desired lateral edge alignment position and contour;

detecting a side edge course of the belt construction strip located between the front tip and the rear tip;

aligning the belt construction strip, located between the front tip and the rear tip, to be symmetrically centered relative to an axis in the feed direction;

detecting a side edge position of the rear tip with the sensor positioned adjacent the lateral side forming the rear tip; and aligning the rear tip in a position in accordance with the detected side edge position by the lateral moving of the first conveying device, wherein the rear tip is deformed so that a lateral edge of a region of the belt construction strip in a vicinity of the rear tip corresponds to a desired lateral edge alignment position and contour.

4. The process according to claim 1, further comprising:
laterally moving a front end of the front tip into a desired lateral alignment position; and
securing the front end against lateral movement,
wherein when a side edge position of the front end is unchanged and is secured against lateral movement caused by lateral movement of portions of the belt construction strip positioned after it in the feed direction, the process further comprises:
changing a position of a lateral edge position of the front tip relative to the feed direction until the lateral edge of the front tip is assumes a desired course.

5. The process according to claim 4, further comprising:
feeding the belt construction strip with the first conveying device;

detecting the front portion of the front tip with a sensor for detecting the side edge position in a transition region to a second conveying device;

laterally moving the belt construction strip until the side edge position of the front end detected by the sensor corresponds to a desired position of the side edge of the front end;

feeding the belt construction strip until holding contact is made with the second conveying device that secures the belt construction strip against lateral movement;

upon making the holding contact, interrupting the feeding;

laterally moving the belt construction strip via the first conveying device until the side edge position of the front tip detected by the sensor corresponds to the desired position, conveying the belt construction strip and detecting the other lateral edge of the belt construction strip with a sensor for detecting the side edge position located in the transition region to the second conveying device;

laterally moving the first conveying device in a manner controlled as a function of actual lateral positions of the two side edges so that side edge courses are substantially symmetrical to an axis extending in the feed direction; and conveying the belt construction strip until a side edge leaves the sensor detecting region in the feed direction.

6. The process according to claim 5, the process further comprising:

lowering a support roll in a controlled manner onto the tip of the belt construction strip in the region of the second conveying device to exhibit holding contact between the belt construction strip and the second conveying device; and raising the support roll before aligning the portion of the belt construction strip between the front tip and the rear tip.

7. The process according to claim 6, lowering a support roll in a controlled manner onto the front tip in the region of the first conveying device to exhibit holding contact between the belt construction strip and the first conveying device; and raising the support roll before aligning the portion of the belt construction strip between the front tip and the rear tip.

8. The process according to claim 5, wherein after the side edge has left a sensor detection region in the feed direction, the process further comprising:
  detecting a side edge position of the other side edge;
  laterally moving the rear tip relative to the belt construction strip secured against lateral movement on the second conveying device via laterally moving the first conveying device, the rear tip being laterally moved in accordance with the detected position; and
  positioning the rear tip in a desired position.

9. The process according to claim 8, wherein after the portion of the belt construction strip between the front tip and the rear tip has left the transition region between the first and second conveying devices, the process further comprising:
  lowering support rolls onto the rear tip to secure holding contact, the lowering of the support rolls comprising lowering one support roll in a region of the first conveying device and lowering another support roll in a region of the second conveying device; and
  raising the support rolls when the rear end of the rear tip has left the transition region between the first and second conveying devices.

10. The process according to claim 1, wherein a desired side edge position for at least one of the front tip and the rear tip deviates from a straight line in the feed direction by an amount of a subsequent side edge deformation expected after the alignment.

11. The process according to claim 1, cutting the belt construction strip on the first conveying device from a belt band material, thereby forming the rear edge of the belt construction strip;

detecting a desired length of the belt construction strip to be cut off via sensors for detecting a front edge of the belt construction strip in the region of a second conveying device positioned downstream from the first conveying device; and actuating the cutting of the belt construction strip in accordance with the detection of the front edge.

12. The process according to claim 1, further comprising:

conveying subsequent construction strips, wherein in conveying the subsequent belt construction strips, the process further comprises:
  utilizing actual side edge positions of a previously adjusted conveyed belt construction strip as set point position values; and
  wherein when a first belt construction strip is processed, the process further comprises:
    predetermining reference values as the set point values for desired edge positions of the two tips.

13. The process according to claim 1, the parallel reinforcing members comprising steel.

14. The process according to claim 1, the subsequent processing device comprising a belt construction drum.

15. The process according to claim 1, the front tip and rear tip forming acute angles being between approximately 10° to 35°.

16. The process according to claim 1, the belt construction material comprising rubber.

* * * * *